(12) United States Patent
Rao et al.

(10) Patent No.: US 11,055,002 B2
(45) Date of Patent: Jul. 6, 2021

(54) PLACEMENT OF HOST DATA BASED ON DATA CHARACTERISTICS

(71) Applicant: Western Digital Technologies, Inc., San Jose, CA (US)

(72) Inventors: Abhijit Rao, Bangalore (IN); Vishwas Saxena, Bangalore (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 231 days.

(21) Appl. No.: 16/101,158

(22) Filed: Aug. 10, 2018

(65) Prior Publication Data
US 2019/0377494 A1    Dec. 12, 2019

Related U.S. Application Data

(60) Provisional application No. 62/683,602, filed on Jun. 11, 2018.

(51) Int. Cl.
*G06F 3/06* (2006.01)
*G06F 12/02* (2006.01)

(52) U.S. Cl.
CPC ........... *G06F 3/064* (2013.01); *G06F 3/061* (2013.01); *G06F 3/0679* (2013.01); *G06F 12/0246* (2013.01); *G06F 2212/7205* (2013.01); *G06F 2212/7207* (2013.01)

(58) Field of Classification Search
CPC ........ G06F 3/064; G06F 3/061; G06F 3/0679; G06F 3/0652; G06F 3/0616; G06F 12/0246; G06F 2212/7207; G06F 2212/7205; G06F 2212/7201; G06F 2212/1036; G06F 2212/1016; G06K 9/6267

See application file for complete search history.

(56) References Cited

U.S. PATENT DOCUMENTS 9,020,892 B2    4/2015 Chan et al.
9,183,134 B2    11/2015 Haines et al.
9,886,208 B2 *  2/2018 Ioannou ................ G06F 3/0616
(Continued)

OTHER PUBLICATIONS

International Search Report and Written Opinion issued in corresponding International Patent Application No. PCT/US2019/017484, dated May 22, 2019 (15 pages).

(Continued)

*Primary Examiner* — Michael Krofcheck
(74) *Attorney, Agent, or Firm* — Patterson & Sheridan, LLP; Steven H. Versteeg

(57) ABSTRACT

Methods for classifying data in a storage device are provided. A data classifier module in a controller calculates a placement factor of one or more streams of data associated with one or more logical block addresses based on a metadata update and recency count table. The data classifier module then classifies the one or more streams of data associated with one or more logical block addresses as hot, warm, or cold streams of data. Hot streams of data are routed to hot open memory blocks, warm streams of data are routed to warm open memory blocks, and cold streams of data are routed to cold open memory blocks. Routing streams of data to hot, warm, or cold open memory blocks results in more efficient garbage collection procedures and the reduction of block erasures.

23 Claims, 9 Drawing Sheets

(56) References Cited

U.S. PATENT DOCUMENTS

| | | | |
|---|---|---|---|
| 9,959,060 B1* | 5/2018 | Tang | G06F 3/0679 |
| 2004/0080985 A1* | 4/2004 | Chang | G06F 12/0246 |
| | | | 365/185.33 |
| 2009/0319721 A1* | 12/2009 | Lin | G06F 12/0246 |
| | | | 711/103 |
| 2010/0174845 A1* | 7/2010 | Gorobets | G06F 12/0246 |
| | | | 711/103 |
| 2011/0173395 A1 | 7/2011 | Bhattacharjee et al. | |
| 2011/0191521 A1* | 8/2011 | Araki | G06F 12/0246 |
| | | | 711/103 |
| 2012/0023144 A1 | 1/2012 | Rub | |
| 2012/0239869 A1 | 9/2012 | Chiueh et al. | |
| 2012/0297122 A1 | 11/2012 | Gorobets et al. | |
| 2013/0311707 A1* | 11/2013 | Kawamura | G06F 12/0246 |
| | | | 711/103 |
| 2014/0013052 A1* | 1/2014 | Sawin | G06F 12/0862 |
| | | | 711/122 |
| 2014/0304480 A1* | 10/2014 | Tang | G06F 11/00 |
| | | | 711/146 |
| 2016/0004464 A1 | 1/2016 | Shen | |
| 2016/0139812 A1 | 5/2016 | Zhang | |
| 2016/0188226 A1 | 6/2016 | Haines et al. | |
| 2017/0090759 A1 | 3/2017 | Ioannou et al. | |
| 2017/0199680 A1 | 7/2017 | Li | |
| 2017/0285948 A1 | 10/2017 | Thomas et al. | |
| 2017/0285967 A1 | 10/2017 | Pandurangan et al. | |
| 2018/0011760 A1 | 1/2018 | Kanno | |
| 2018/0188980 A1* | 7/2018 | Tai | G06F 12/0246 |

OTHER PUBLICATIONS

Alsalibi, Ahmed Izzat et al.; "A Survey of Techniques for Architecting SLC/MLC/TLC Hybrid Flash Memory based SSDs", Wiley InterScience; www.interscience.wiley.com; Concurrency Computat.: Prac. Exper., 2016; pp. 1-27.

* cited by examiner

PLACEMENT OF HOST DATA BASED ON DATA CHARACTERISTICS

CROSS-REFERENCE TO RELATED APPLICATIONS

This application claims benefit of U.S. Provisional Patent Application Ser. No. 62/683,602, filed Jun. 11, 2018, which is herein incorporated by reference

BACKGROUND

Field

The disclosure is generally related to data storage devices and more specifically to solid state drives (SSDs).

Description of the Related Art

During operation of an SSD, several applications supported by a host device may send data to a storage device for processing and storage. While processing the data, the data from one or more applications may be combined to create sequential and random streams of data based on length. Once the streams of data are created as sequential or random streams of data, the streams of data are routed to corresponding sequential or random open memory blocks to avoid mixing of sequential and random data. However, during garbage collection, sequential and random data are often mixed due to the movement of sequential and random data into a single destination garbage collection memory block. Mixing of sequential and random data creates a plurality of partially valid, fragmented memory blocks, triggering early garbage collection and causing increased memory block erasures.

Additionally, certain applications supported by the host device may frequently duplicate data or send new data to the data storage device to overwrite previous data, while other applications may never or rarely send overwrites to the data storage device. Thus, data from a first application that sends frequent overwrites may be in the same sequential stream of data as data from a second application that never sends overwrites, if both the first and second applications have a larger granularity of data. Data that is frequently overwritten or updated is invalidated, resulting in a fragmented memory block due to partial invalidation. Having numerous open memory blocks or partially open memory blocks is a disadvantage, as the efficiency of the system is reduced due to early garbage collection being triggered and an increase in memory block erasures.

Therefore, there is a need in art for a storage system that increases garbage collection efficiency and reduces block erasures.

SUMMARY

Methods for classifying data in a storage device are provided. A data classifier module in a controller calculates a placement factor of one or more streams of data associated with one or more logical block addresses based on a metadata update and recency count table. The data classifier module then classifies the one or more streams of data associated with one or more logical block addresses as hot, warm, or cold streams of data. Hot streams of data are routed to hot open memory blocks, warm streams of data are routed to warm open memory blocks, and cold streams of data are routed to cold open memory blocks. Routing streams of data to hot, warm, or cold open memory blocks results in more efficient garbage collection procedures and the reduction of block erasures.

In one embodiment, a method for classifying data in a data storage device comprises receiving, by a controller of the data storage device, one or more streams of data associated with one or more logical block addresses. A placement factor for each of the one or more logical block addresses is then calculated. An average placement factor is calculated based on the total number of logical block addresses in the data storage device. The placement factor of each of the one or more logical block addresses is compared to the average placement factor. Each of the one or more logical block addresses is classified as hot logical block addresses, warm logical block addresses, or cold logical block addresses based on the comparison of the placement factor of each of the one or more logical block addresses to the average placement factor. Each of the one or more streams of data associated with the hot logical block addresses are routed to a hot open memory block of the data storage device, each of the one or more streams of data associated with the warm logical block addresses are routed to a warm open memory block of the data storage device, and each of the one or more streams of data associated with the cold logical block addresses are routed to a cold open memory block of the data storage device.

In another embodiment, a method for classifying data in a data storage device comprises receiving, by a controller of the data storage device, one or more streams of data associated with one or more logical block addresses, and determining that there is a stream switch of the one or more streams of data. The method further comprises determining whether each of the one or more streams of data that have been determined to have undergone a stream switch have further undergone one or more overwrites. In a data classifier module of the data storage device, a placement factor is calculated for each of the one or more streams of data that have been determined to have undergone one or more overwrites. Each of the one or more streams of data are classified as hot streams of data or warm streams of data based on the placement factor of each of the one or more streams of data. The hot streams of data are routed to a hot open memory block of the plurality of memory blocks and the warm streams of data are routed to a warm open memory block of the plurality of memory blocks.

In one embodiment, a data storage device comprises one or more memory devices comprising a plurality of memory blocks. A controller is coupled to the one or more memory devices. The controller is configured to receive one or more streams of data associated with one or more logical block addresses. A random access memory is coupled to the controller. The random access memory includes a flash transition layer and a log page coupled to the one or more memory devices. A data classifier module is located in the random access memory. The data classifier module is coupled to the controller and the plurality of memory blocks. The data classifier module is configured to store a metadata entry update count and a recency count of each of the one or more logical block addresses. The metadata update and recency count table is stored in the log page.

In another embodiment, a data storage device comprises one or more memory devices comprising a plurality of memory blocks, and means for receiving one or more streams of data associated with one or more logical block addresses. The data storage device further comprises means for updating a metadata update and recency count table for each of the one or more logical block addresses, means for calculating a placement factor for each of the one or more streams of data associated with the one or more logical block addresses based on the metadata update and recency count table, and means for classifying each of the one or more streams of data associated with the one or more logical block addresses as hot streams of data, warm streams of data, or cold streams of data based on the placement factor. The data storage device further comprises means for routing the hot streams of data to a hot open memory block of the plurality of memory blocks, routing the warm streams of data to a warm open memory block of the plurality of memory blocks, and routing the cold streams of data to a cold open memory block of the plurality of memory blocks.

In yet another embodiment, a data storage system comprises a host device and a storage device coupled to the host device. The storage device comprises one or more memory devices comprising a plurality of memory blocks, and a controller coupled to the one or more memory devices. The controller is configured to receive one or more streams of data from the host device. A data classifier module is coupled to the controller and the one or more memory devices. The data classifier module is configured to classify each of the one or more streams of data as hot, warm, or cold based on a placement factor of each of the one or more streams of data, and route each of the one or more streams of data to a hot open memory block of the plurality of memory blocks, a warm open memory block of the plurality of memory blocks, or a cold open memory block of plurality of memory blocks based on the classification of each of the one or more streams of data as hot, warm, or cold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Particular examples in accordance with the disclosure are described below with reference to the drawings. In the description, common features are designated by common reference numbers. As used herein, "exemplary" may indicate an example, an implementation, and/or an aspect, and should not be construed as limiting or as indicating a preference or a preferred implementation. Further, it is to be appreciated that certain ordinal terms (e.g., "first" or "second") may be provided for identification and ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." As used herein, a structure or operation that "comprises" or "includes" an element may include one or more other elements not explicitly recited. Further, an operation performed "based on" a condition or event may also be performed based on one or more other conditions or events not explicitly recited.

Methods for classifying data in a storage device are provided. A data classifier module in a controller calculates a placement factor of one or more streams of data associated with one or more logical block addresses based on a metadata update and recency count table. The data classifier module then classifies the one or more streams of data associated with one or more logical block addresses as hot, warm, or cold streams of data. Hot streams of data are routed to hot open memory blocks, warm streams of data are routed to warm open memory blocks, and cold streams of data are routed to cold open memory blocks. Routing streams of data to hot, warm, or cold open memory blocks results in more efficient garbage collection procedures and the reduction of block erasures.

Figure 1A:
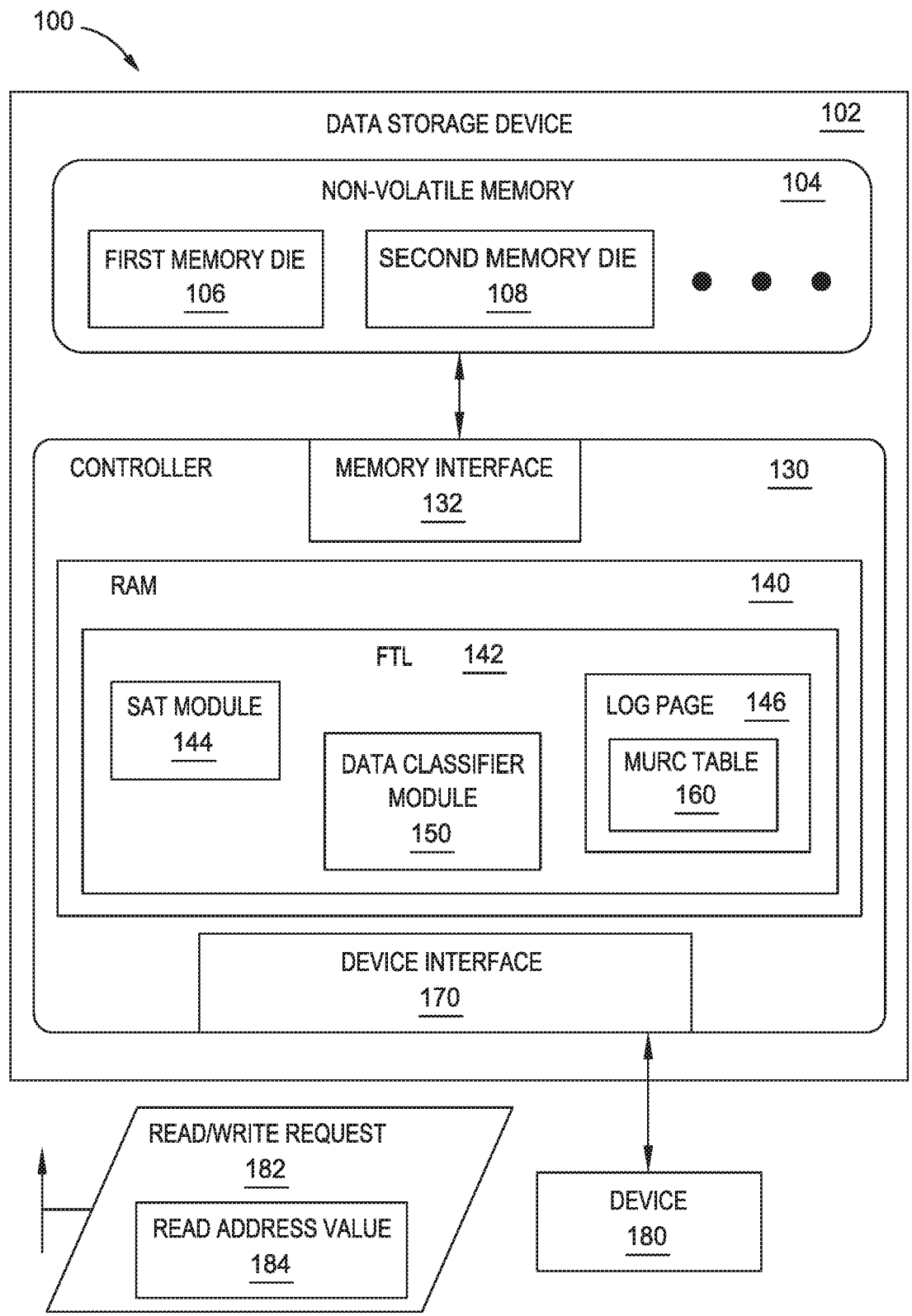
FIG. 1A illustrates a schematic data storage system, according to one embodiment.

FIG. 1A illustrates a schematic data storage system 100 including a data storage device according to one implementation described herein. The system 100 includes the data storage device 102 that is communicatively coupled to a host device 180. In at least one implementation, the data storage device 102 includes a non-volatile memory 104 and a controller 130. The controller 130 is communicatively coupled to the non-volatile memory 104 via a memory interface 132.

Host device 180 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1A, storage device 102 may include controller 130, non-volatile memory 104, and device interface 170. In some examples, storage device 102 may include additional components not shown in FIG. 1A for sake of clarity. For example, storage device 102 may include a printed board (PB) to which components of storage device 102 are mechanically attached and which includes electrically conductive traces that electrically interconnect components of storage device 102, or the like. In some examples, the physical dimensions and connector configurations of storage device 102 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, storage device 102 may be directly coupled (e.g., directly soldered) to a motherboard of host device 180.

The controller 130 includes a device interface 170 that is communicatively coupled to the host device 180. The controller 130 includes a random access memory (RAM) 140. In at least one implementation, the RAM 140 includes a flash translation layer (FTL) 142. The FTL 142 includes a data classifier module 150, a storage address table (SAT) module 144, and a log page 146.

Figure 1B:
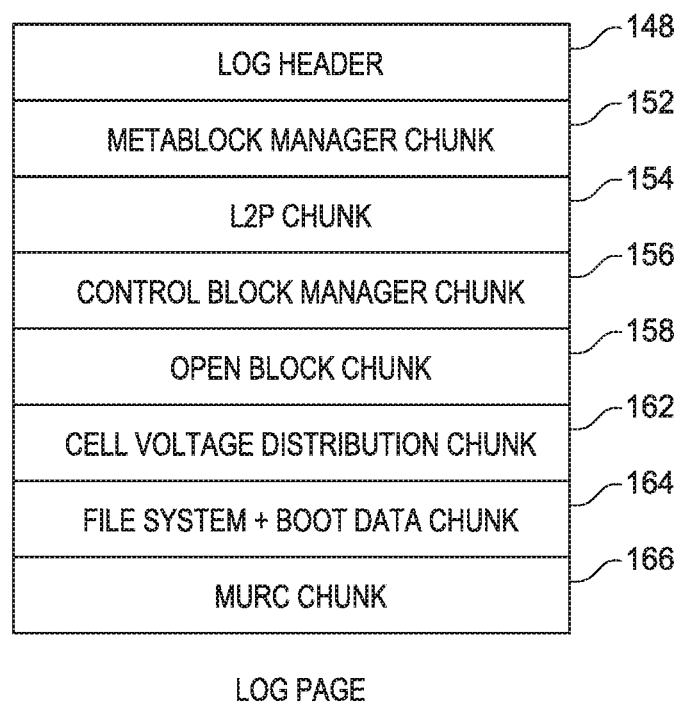
FIG. 1B illustrates a log page, according to one embodiment.

FIG. 1B illustrates a log page 146, according to one embodiment. The FTL 142 may send control data or metadata logs to a flash memory device in the form of a log page 146. The log page 146 captures the state of the data storage system 100 at different time intervals. The log page 146 holds control data of all the modules in the system 100, and may be partitioned into different blocks or chunks. For example, the log page 146 may comprise a log header 148, a metablock manager chunk 152, a logical to physical (L2P) chunk 154, a control block manager chunk 156, an open block chunk 158, a cell voltage distribution chunk 162, a file system and boot data chunk 164, and a metadata update and recency count (MURC) chunk 166. It is to be understood that the log page 146 may further comprise other data or chunks not listed, such as a garbage collection chunk or a wear levelling chunk.

Since the log page 146 resides in the RAM 140, the MURC chunk 166 of the log page 146 also resides in the RAM 140, and updating the MURC chunk 166 does not require flash reads during operation of the firmware of the data storage device 102. When the log page 146 is written to a flash memory device, such as non-volatile memory 104, the control data of all the modules in the system 100, including the MURC chunk 166, are also written to the flash memory device. Each time the system 100 is started or booted up, the log page 146 is read from the flash memory device into the RAM 140.

Interface 170 may include one or both of a data bus for exchanging data with host device 180 and a control bus for exchanging commands with host device 180. Interface 170 may operate in accordance with any suitable protocol. For example, interface 170 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), or the like. The electrical connection of interface 170 (e.g., the data bus, the control bus, or both) is electrically connected to controller 130, providing electrical connection between host device 180 and controller 130, allowing data to be exchanged between host device 180 and controller 130. In some examples, the electrical connection of interface 170 may also permit storage device 102 to receive power from host device 180.

The non-volatile memory 104 includes at least one memory die, such as a first memory die 106 and a second memory die 108. The first memory die 106 contains a non-volatile array of storage elements. The non-volatile memory 104 may include a flash memory or a resistive memory. The non-volatile memory 104 may have a planar or a three-dimensional memory configuration. The non-volatile memory 104 may be configured to store and/or retrieve data. In some examples, each of the memory devices may be referred to as a die or blocks. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

The device interface 170 is capable of receiving a read/write request 182 via the device 180 during a control sync operation. The read/write request 182 contains at least one read address value 184 that is associated with data stored in the non-volatile memory 104. In at least one implementation, the FTL 142 is configured to perform an address translation using the read address value 184 provided by the read/write request 182. In at least one implementation, the read address value 184 translates to a physical address associated with the data on the non-volatile memory 104. The memory interface 132 is configured to read data from the non-volatile memory 104 based on the read address value 184. In at least one implementation, the controller 130 returns the data from the non-volatile memory 104 to the host 180 via the memory interface 132 and the device interface 170.

In one embodiment, the SAT module 144 points to a physical address of a storage element in the non-volatile memory 104 based on the read address value 184. Examples of physical addresses of storage elements include blocks, sectors, or wordlines. The SAT module 144 further contains logical block addresses (LBAs) that are mapped or linked to physical block addresses (PBAs) of the storage elements in the non-volatile memory 104. Every LBA maps to one logical data unit (LDU). The LDU indicates the granularity of data in an LBA. The SAT module 144 may be further configured to perform other functions, such as even-wear leveling, garbage collection, and write amplification.

The mapping of LBAs to PBAs generates metadata entries, and the SAT module 144 is configured to update the metadata entries. The metadata entries may be stored in the RAM 140. In at least one implementation, metadata entries may include LBAs that have been recently updated or recently accessed. The metadata entries of the LBA may be combined in one or more metapages. Each metapage may have a metapage number and/or a metapage ID.

Once the SAT module 144 generates or updates the metadata entries of the LBAs, the SAT module 144 may send the metadata entries to the data classifier module 150. The data classifier module 150 is configured to update a MURC table 160 by updating the metadata update count and recency count for each LBA. The MURC table 160 stores the metadata entries, metapage numbers, and/or metapage IDs, which are used to determine a metadata update count for each LBA. The MURC table 160 also stores a recency count for each of the LBA. The MURC table 160 may be stored in the log page 146, and more specifically, may be stored in the MURC chunk 166 of the log page 146.

Using the MURC table 160, the data classifier module 150 is configured to classify the data associated with the LBAs as hot data, warm data, or cold data. Hot data is data that is updated frequent, warm data is updated less frequently than hot data, and cold data is data that is rarely updated. The data classifier module 150 is configured to calculate a placement factor of each LBA based on the MURC table 160. The data classifier module 150 is further configured to calculate an average placement factor (APF) based on all of the LBAs received by the data storage device 102, and compare the placement factor of each of the one or more LBAs to the APF. The data classifier module 150 is configured to classify each of the one or more LBAs as hot, warm, or cold based on the comparison between the APF and the placement factor of each LBA. The data classifier module 150 may then be configured to route the data associated with the hot LBAs to a hot open memory block, the data associated with the warm LBAs to warm open memory block, and the data associated with the cold LBAs to a cold open memory block.

Figure 2:
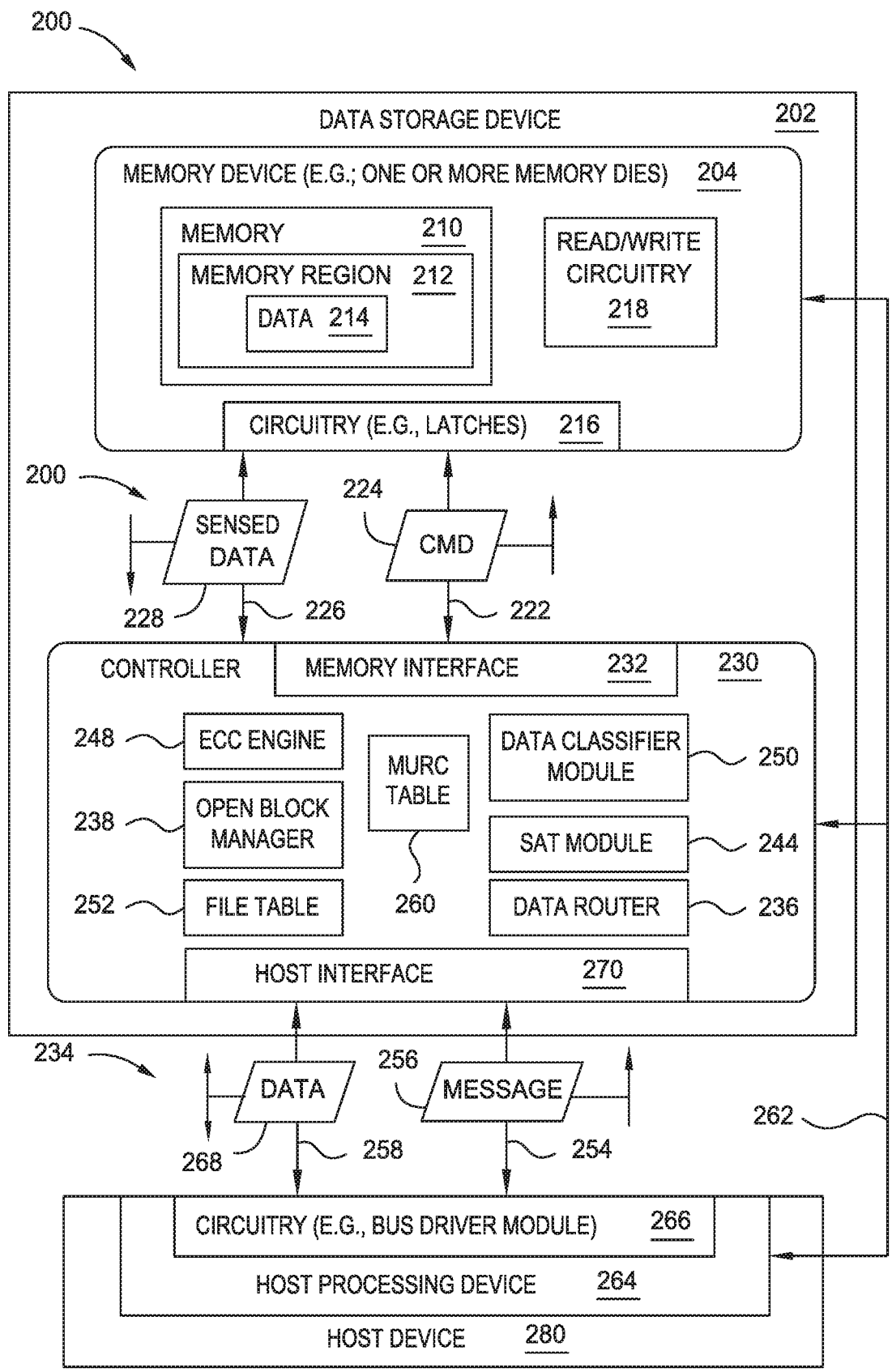
FIG. 2 is a block diagram of a particular illustrative example of a data storage system including a data storage device and a data classifier module, according to another embodiment.

FIG. 2 depicts an illustrative example of a data storage system 200 according to another embodiment. The data storage system 200 includes a data storage device 202 (e.g., the data storage device 102) and a host device 280 (e.g., the host 180).

The data storage device 202 includes a memory device, such as a memory device 204. The memory device 204 may include one or more memory dies (e.g., one memory die, two memory dies, eight memory dies, or another number of memory dies). To further illustrate, the memory device 204 may include the non-volatile memory die 104. The memory device 204 includes a memory 210, such as a non-volatile memory of storage elements included in a memory die of the memory device 204. For example, the memory 210 may include a flash memory, such as a NAND flash memory, or a resistive memory, such as a resistive random access memory (ReRAM), as illustrative examples. The memory 210 may have a three-dimensional (3D) memory configuration. As an example, the memory 210 may have a 3D vertical bit line (VBL) configuration. In a particular implementation, the memory 210 is a non-volatile memory having a 3D memory configuration that is monolithically formed in one or more physical levels of arrays of memory cells having an active area disposed above a silicon substrate. Alternatively, the memory 210 may have another configuration, such as a two-dimensional (2D) memory configuration or a non-monolithic 3D memory configuration (e.g., a stacked die 3D memory configuration).

The memory 210 includes one or more regions of storage elements, such as a memory block 212. An example of a memory block is a NAND flash erase group of memory elements, or a word line of memory elements. A word line may function as a single-level-cell (SLC) word line or as a multi-level-cell (MLC) word line (such as a three-bit-per-cell word line or a two-bit-per-cell word line, as illustrative examples). Each memory element of the memory 210 may be programmable to a state (e.g., a threshold voltage in a flash configuration or a resistive state in a resistive memory configuration) that indicates one or more bit values.

The memory device 204 further includes read/write circuitry 218. The read/write circuitry 218 is configured to program values to storage elements of the memory 210 and to sense values from memory elements of the memory 210. The memory device 204 further includes circuitry 216 (e.g., one or more data latches, one or more control latches, or a combination thereof).

The data storage device 202 further includes a controller 230, such as controller 130 of FIG. 1A. The controller 230 includes a host interface 270 (e.g., host interface 170), a data classifier module 250, an SAT module 244, a MURC table 260, an error correction code (ECC) engine 248, a data router 236, a memory interface 232 (e.g., memory interface 132), and an open block manager 238. Additionally, the data classifier module 250 may correspond to the data classifier module 150, the SAT module 244 may correspond to the SAT module 144, and the MURC table 260 may correspond to the MURC table 160. The host interface 270 may include one or more latches to receive data and commands from the host device 280, and the memory interface 232 may include one or more bus drivers to send data and commands to the circuitry 216 of the memory device 204. The controller 230 stores (or accesses) a file table 252, such as a file allocation table (FAT). The controller 230 may further include a RAM and an FTL (not shown).

The host device 280 includes circuitry 266. For example, the circuitry 266 may include one or more bus drivers. The circuitry 266 may be integrated within or coupled to a processor or controller of the host device 280, such as within a host processing device 264 (e.g., an application processor).

The data storage device 202 and the host processing device 264 are coupled via a connection 234 (e.g., a bus). For example, FIG. 2 illustrates that the connection 234 includes one or more data lines 258 and one or more control lines 254. The connection 234 is coupled to the host interface 270 and to the circuitry 266.

The memory device 204 and the controller 230 are coupled via a connection 220 (e.g., a bus). For example, FIG. 2 illustrates that the connection 220 includes one or more data lines 226, one or more control lines 222. The connection 220 is coupled to the circuitry 216 and to the memory interface 232.

In an illustrative implementation, the data storage system 200 further includes a power supply connection 262 (e.g., a "rail" to provide a power supply voltage, such as VDD, VCC, or both). The power supply connection 262 is coupled to the memory device 204, the controller 230, and the host processing device 264. Depending on the particular implementation, the power supply connection 262 may be supplied by a battery (e.g., a mobile device battery) or by a power supply device (e.g., a transformer) coupled to a main power supply. In other implementations, the memory device 204, the controller 230, and/or the host processing device 264 are connected to separate power supply connections.

During operation, the controller 230 is configured to receive data and instructions from the host device 280 using the host interface 270. For example, the controller 230 may receive data 268 from the host device 280 via the host interface 270. To further illustrate, the data 268 may be received via the one or more data lines 258 in connection with a request for write access sent via the one or more control lines 254. The controller 230 may also be configured to receive instructions or messages 256 from the host device 280 via the one or more control lines 254.

The ECC engine 248 may be configured to receive the data 268 and to generate one or more ECC codewords based on the data 268. The ECC engine 248 may include a Hamming encoder, a Reed-Solomon (RS) encoder, a Bose-Chaudhuri-Hocquenghem (BCH) encoder, a low-density parity check (LDPC) encoder, a turbo encoder, an encoder configured to encode data according to one or more other ECC schemes, or a combination thereof.

The controller 230 is configured to send data and commands to the memory device 204 using the memory interface 232 and to receive data from the memory device 204 using the memory interface 232. The controller 230 is configured to send a read command (e.g., the command 224) to the memory device 204 to access data from a specified address of the memory 210. For example, the controller 230 may send the read command to the memory device 204 in response to receiving a request for read access from the host device 280. The read command may specify the physical address of a portion of the memory 210. For example, the read command may specify the physical address of a portion of the memory 210 storing the data. In response to the read command, the memory device 204 may cause the read/write circuitry 218 to sense the portion of the memory 210 storing the data to generate sensed data 228 (e.g., a representation of the data that may differ with respect to the data due to one or more bit errors).

For example, the controller 230 may send a read command (e.g., the command 224) to the memory device 204 using the connection 220. The read command may specify the physical address of the memory block 212. The memory device 204 may cause the read/write circuitry 218 to sense the memory block 212 to generate sensed data 228. The memory device 204 may provide the sensed data 228 to the controller 230 using the connection 220, and the controller 230 may receive the sensed data 228 using the memory interface 232.

The controller 230 is configured to receive the sensed data 228 from the memory device 204 via the memory interface 232. The controller 230 may input the sensed data 228 to the ECC engine 248 to initiate a decoding process to correct one or more bit errors in the sensed data (if any) up to a particular error correction capability of the particular ECC technique. In response to decoding the sensed data 228, the ECC engine 248 may output the data 268. The controller 230 may provide the data 268 to the host device 280 using the host interface 270.

The controller 230 is further configured to send data (e.g., one or more ECC codewords generated by the ECC engine 248) and a write command (e.g., a command 224) to cause the memory device 204 to store the data to a specified address of the memory 210. The write command may specify a physical address of a portion of the memory 210 that is to store the data. To further illustrate, the controller 230 may send the data to the memory device 204 via the one or more data lines 226 in connection with a write command sent via the one or more control lines 222.

In one embodiment, in response to receiving a message 256 from the host device 280, the controller 230 may cause the memory interface 232 to send data 214 and a write command (e.g., the command 224) to the circuitry 216 using the connection 220. The write command may specify one or more physical addresses of the memory 210, such as a physical address of the memory block 212. Upon receiving the data 214 at the circuitry 216, the memory device 204 may cause the read/write circuitry 218 to program the data 214 to the memory 210. In response to programming the data 214 to the memory 210, the memory device 204 may send a status indication to the controller 230 indicating a status of the write operation (e.g., a pass or fail status).

In at least one implementation, the host device 280 sends data 268 associated with LBAs to the controller 230 for the controller to have written to the memory 210. In one embodiment, data 268 is sequential data. Once the controller 230 receives the data 268, the SAT module 244 generates or updates the metadata entries of the LBAs, and sends the metadata entries to the data classifier module 250. The data classifier module 250 is configured to update a MURC table 260. Based on the MURC table 260, the data classifier module 250 is configured to classify the data 268 associated with the LBAs as hot data, warm data, or cold data.

Once the data classifier module 250 classifies the data as hot, warm or cold, a data router 236 routes the classified data to an open block manager 238. The open block manager 238 determines which memory blocks 212 are open to write the classified data to, and may further determine which of the open blocks are hot open blocks, warm open blocks, and cold open blocks. The open block manager 238 routes the hot streams of data to hot open blocks, the warm streams of data to the warm open blocks, and the cold streams of data to the cold open blocks in the memory 210.

Figure 3:
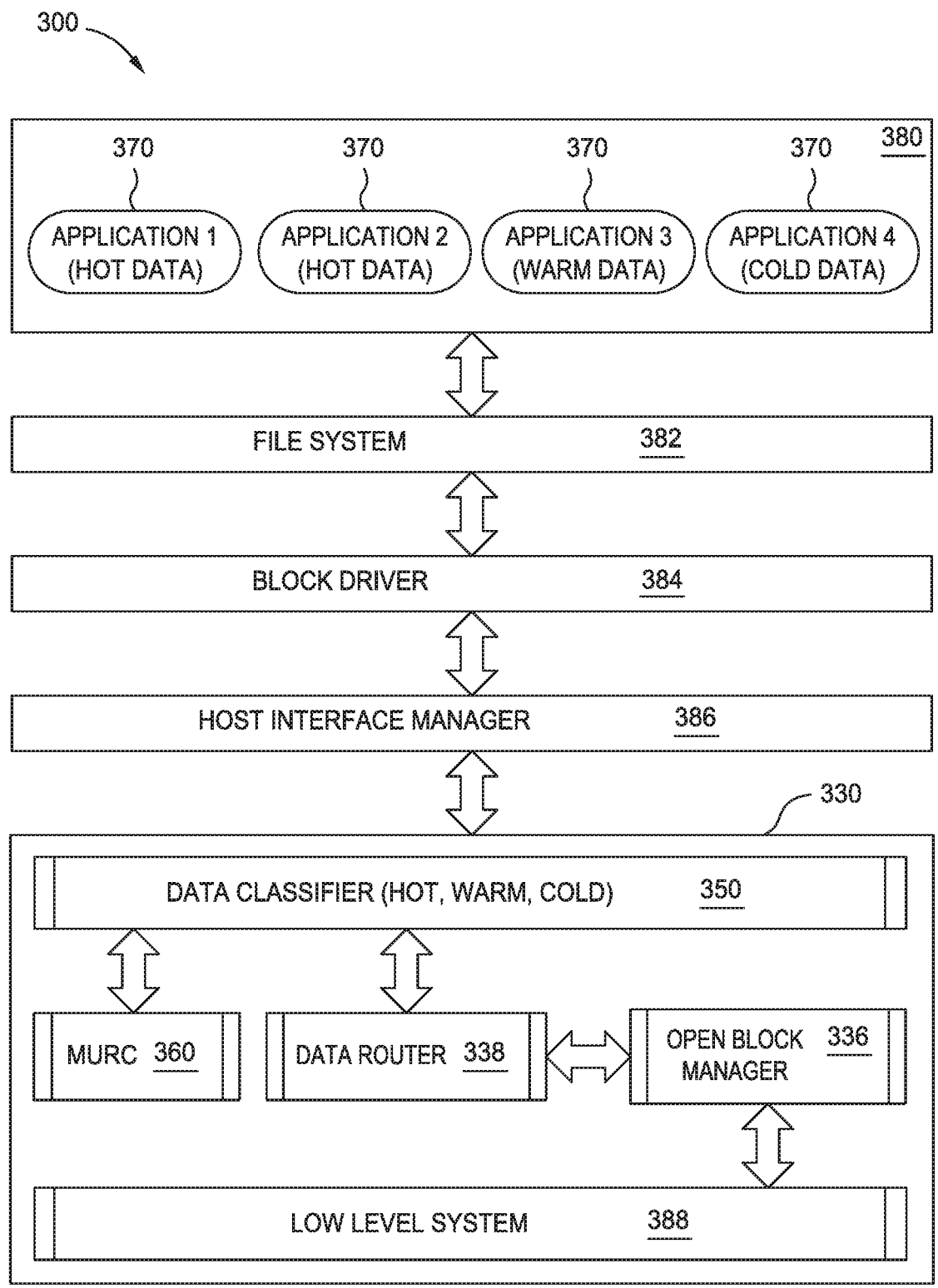
FIG. 3 is an exemplary embodiment of a data storage system comprising a data classifier module, according to yet another embodiment.

FIG. 3 illustrates an exemplary embodiment of a data storage system 300 having a data classifier module 350. The data storage system 300 includes a host device 380 and a controller 330. The host device 380 may be host device 180 of FIG. 1A, or host device 280 of FIG. 2. The controller 330 may be controller 130 of FIG. 1A, or controller 230 of FIG. 2. The controller 330 includes a data classifier module 350 and a MURC table 360. The data classifier module 350 may be the data classifier module 150 of FIG. 1A, or the data classifier module 250 of FIG. 2. The MURC table 360 may be the MURC table 160 of FIG. 1A, or the MURC table 260 of FIG. 2. The controller further includes a data router 338, an open block manager 336, and a low level system 388. The data router 338 may be the data router 236 of FIG. 2, and the open block manager 336 may be the open block manager 238 of FIG. 2.

The host device 380 comprises one or more applications 370. The applications 370 are configured to generate one or more streams of data, and may generate hot, warm, or cold streams of data. In one embodiment, the one or more streams of data are sequential data streams. The host device 380 is configured to send the one or more streams of data to the controller 330. In one embodiment, the one or more streams of data are first routed to a file system 382, a block driver 384, and a host interface manager 386 before the one or more streams of data are received by the controller 330.

Once the one or more streams of data are received by the controller 330, the controller 330 sends the one or more streams of data to the data classifier module 350. The data classifier module 350 is configured to update the MURC table 360, and to calculate a placement factor of the one or more streams of data based on the MURC table 360. In one embodiment, the data classifier module 350 is further configured to calculate an APF of all the streams of data, and to compare the APF to the placement factor of each of the one or more streams of data. Based on the comparison of the APF to the placement factor of each of the one or more streams of data, the data classifier module 350 classifies each of the one or more streams of data as hot, warm, or cold. It is to be understood that while FIG. 3 shows Applications 1-4 as being hot, warm, or cold, the labeling is simply for understanding how the streams will be classified at the data classifier module 350. The host device 380 does not classify the streams.

Once the data classifier module 350 classifies each of the one or more streams of data as hot, cold, or warm, the data classifier module 350 sends the classified streams of data to the data router 338. The data router 338 routes the classified streams of data to the open block manager 336. The open block manager 336 determines which memory blocks are open to store the classified data to, and further determines which of the open blocks are hot open blocks, warm open blocks, and cold open blocks. The open block manager 336 routes the hot streams of data to hot open blocks, the warm streams of data to the warm open blocks, and the cold streams of data to the cold open blocks in the low level system 388. Thus, hot memory blocks are comprised of hot streams of data, warm memory blocks are comprised of warm streams of data, and cold memory blocks are comprised of cold streams of data.

Since hot streams of data are overwritten frequently, the hot memory blocks will be invalidated and be automatically freed, reducing the number of fragmented, partially valid memory blocks. Thus, garbage collection can target warm and cold memory blocks to increase garbage collection efficiency and reduce block erasures. Reducing the number of block erasures improves block endurance, and more efficient garbage collection results in reduced write amplification, improving the overall write performance of a data storage system.

Figure 4:
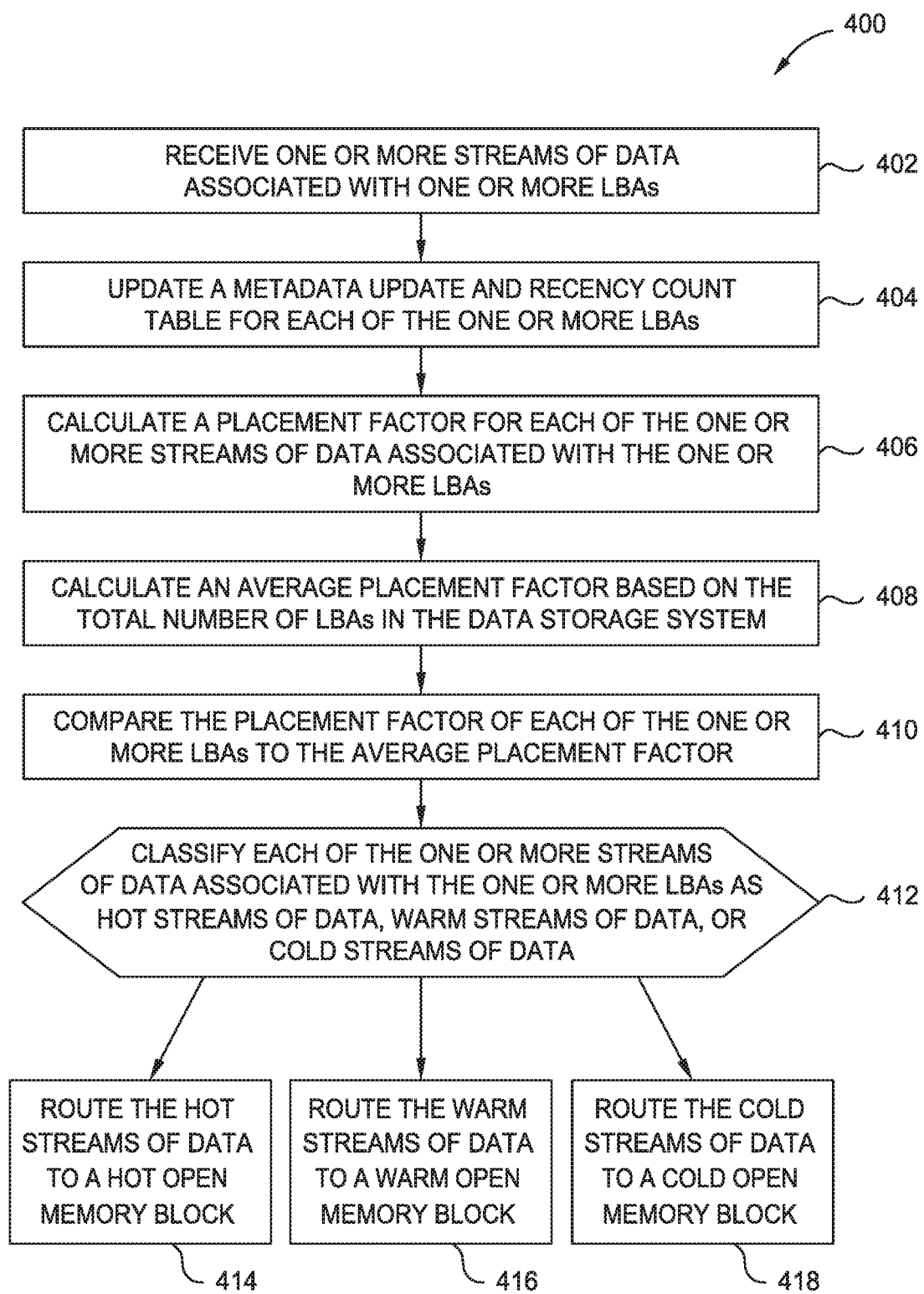
FIG. 4 illustrates a method of classifying data, according to one embodiment.

FIG. 4 illustrates a method 400 for classifying data in a data storage system. The data storage system may be data storage device 102 of FIG. 1A, the data storage device 202 of FIG. 2, or the data storage system of FIG. 3. The data storage system may comprise a host device, such as host device 180 of FIG. 1A or host device 280 of FIG. 2, a controller, such as controller 130 of FIG. 1A or controller 230 of FIG. 2, and one or more memory devices, such as memory device 104 of FIG. 1A or memory device 204 of FIG. 2. The one or more memory devices may comprise a plurality of memory blocks, such as memory blocks 212 of FIG. 2. The controller may include a data classifying module, such as data classifier module 150 of FIG. 1A or data classifier module 250 of FIG. 2. In one embodiment, the method 400 only classifies sequential data.

In operation 402, the controller receives one or more streams of data associated with one or more LBAs from the host device. The controller may further receive a command from the host device to write the one or more streams of data to the memory device. The one or more streams of data may be from one or more applications of the host device. In one embodiment, the controller determines whether each of the one or more LBAs has undergone or more overwrites.

In operation 404, the data classifier module of the controller stores and updates the MURC table for each of the one or more LBAs by updating the metadata entry update count and the recency count of the one or more LBAs. The MURC table is comprised of a metadata entry update count for each of the one or more LBAs and a recency count of the one or more LBAs.

The metadata entry update count is directly proportional to the number of times an LBA has been referenced. Thus, the more frequently the LBA has been referenced, the higher the metadata entry update count. Additionally, the metadata entry update count is increased if the LBA has been overwritten or updated. As such, the more frequently the LBA has been overwritten or updated, the higher the metadata entry update count. The recency count comprises a time stamp associated with each of the one or more LBAs. The time stamp increases when a corresponding LBA has been updated. The recency count of the LBA is increased each time the time stamp is increased.

In operation 406, the data classifier module calculates a placement factor for each of the one or more LBAs associated with the one or more streams of data. The placement factor for each of the one or more LBAs is based on the MURC table. For each LBA, the placement factor is equal to a predetermined metadata update count weightage multiplied by the metadata update count for the LBA added to a predetermined recency count weightage multiplied by the recency count for the LBA. The predetermined metadata update count weightage may be a predetermined priority value given to the metadata update count, and may be any value between 1%-100%. Similarly, the predetermined recency count weightage may be a predetermined priority value given to the metadata update count, and may be any value between 1%-100%.

In operation 408, the data classifier module calculates an APF based on the total number of LBA in the data storage system. The APF is equal to a sum of the total placement factors for all valid LBAs divided by the total number of valid un-erased LBAs. The APF may be dynamic and vary over time. In one embodiment, the APF is calculated by traversing the entire MURC table. In operation 410, the placement factor for each of the one or more LBAs is compared to an APF. In one embodiment, the data classifier module determines a numeral or ratio of the placement factor of each of the one or more LBAs to the APF.

In operation 412, the data classifier module classifies each of the one or more LBAs as hot, warm, or cold based on the comparison of the placement factor for each of the one or more LBAs to the APF. In one embodiment, an LBA may be classified as hot if the placement factor of the LBA is greater than the APF. An LBA may be classified as warm if the placement factor of the LBA is greater than 50% of the APF but less than 100% of the APF. An LBA may be classified as cold if the placement factor of the LBA is lower than 50% of the APF. The 50% threshold between cold data and warm data may be dynamic, and thus, may vary over time.

In operation 414, the data classifier module routes the streams of data associated with the hot LBAs to a hot open memory block of the data storage system. In operation 416, the data classifier module routes the streams of data associated with the warm LBAs to a warm open memory block of the data storage system. In operation 418, the data classifier module routes the streams of data associated with the cold LBAs to a cold open memory block of the data storage system.

Figure 5:
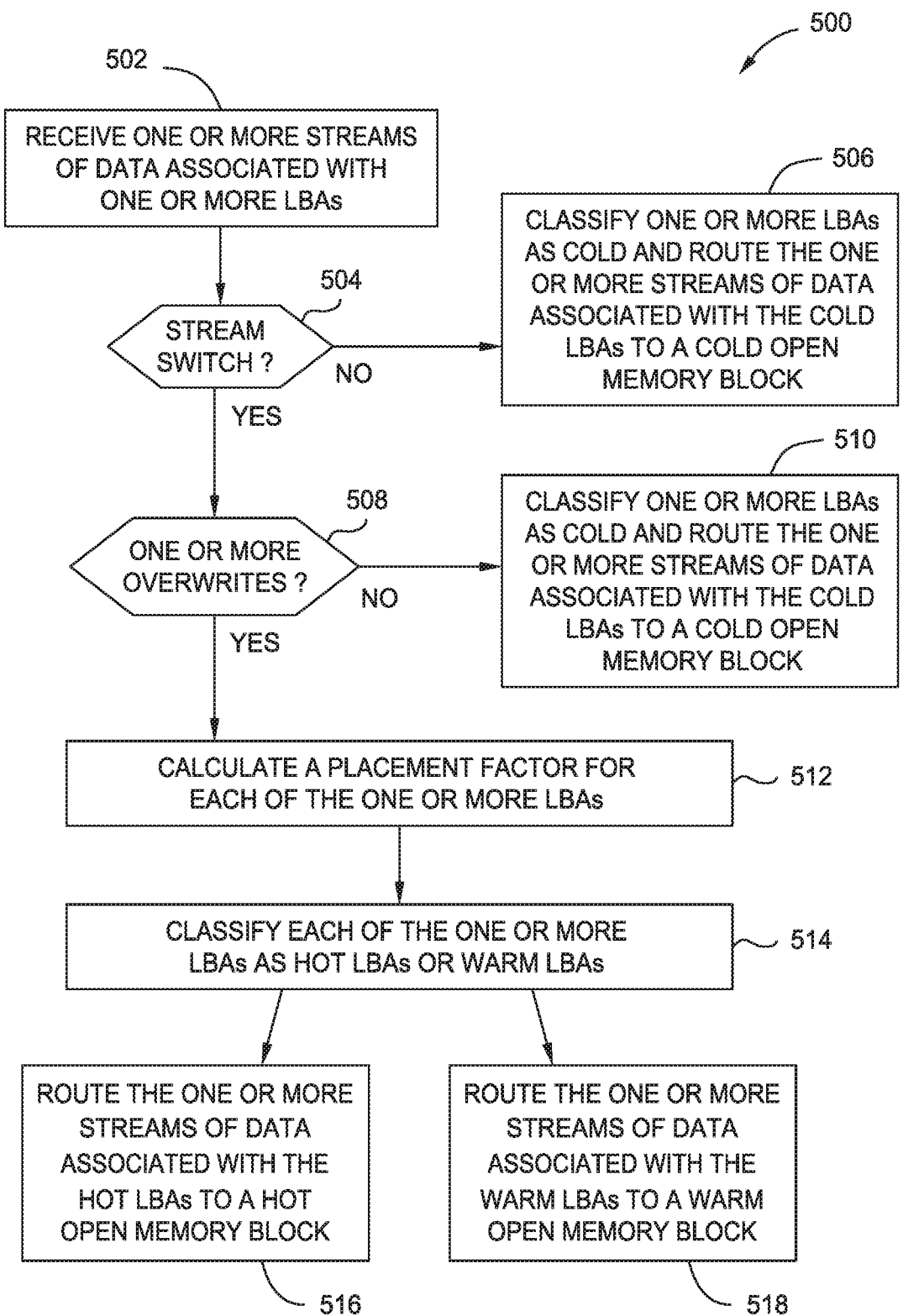
FIG. 5 illustrates a method of classifying data, according to another embodiment.

FIG. 5 illustrates a method 500 for classifying data in a data storage device, according to another embodiment. Method 400 and method 500 may be used in combination, or separately. The data storage system may be data storage device 102 of FIG. 1A, data storage device 202 of FIG. 2, or data storage system 300 of FIG. 3. The data storage system may comprise a host device, such as host device 180 of FIG. 1A or host device 280 of FIG. 2, a controller, such as controller 130 of FIG. 1A or controller 230 of FIG. 2, and one or more memory devices, such as memory device 104 of FIG. 1A or memory device 204 of FIG. 2. The one or more memory devices may comprise a plurality of memory blocks, such as memory blocks 212 of FIG. 2. The controller may include a data classifying module, such as data classifier module 150 of FIG. 1A or data classifier module 250 of FIG. 2. In one embodiment, the method 500 only classifies sequential data.

In operation 502, the controller receives one or more streams of data associated with one or more LBAs from the host device. The one or more streams of data may be from one or more applications of the host device. The controller may further receive a command from the host device to write the one or more streams of data to the memory device.

In operation 504, the controller determines whether there has been a stream switch of the one or more LBAs. In one embodiment, if the controller receives host data belonging to more than one stream, there has been a stream switch of the LBA. Similarly, if the controller receives data belonging only to a single stream, there is no stream switch. If the controller determines that one or more of the LBAs belong only to a single host stream, the method 500 proceeds to operation 506. In operation 506, the controller classifies the LBAs belonging only to one host stream as cold, and routes the one or more streams of data associated with the one or more cold LBAs to a cold open memory block. If the controller determines there has been a stream switch of one or more of the LBA, the method 500 proceeds to operation 508.

In operation 508, the controller determines whether each of the one or more LBAs has undergone one or more overwrites or updates. If the controller determines that one or more of the LBAs have not undergone one or more overwrites or updates, the method 500 proceeds to operation 510. In operation 510, the controller classifies the one or more LBAs that have not undergone overwrites or updates as cold, and routes the one or more streams of data associated with the one or more cold LBAs to a cold open memory block.

If the controller determines that one or more LBAs have undergone one or more overwrites or updates, the method proceeds to operation 512. In operation 512, the data classifying module receives the one or more LBAs that have undergone one or more overwrites or updates, and calculates a placement factor for each of the one or more LBAs. The placement factor of method 500 may be calculated the same as the in method 400. The placement factor for each of the one or more LBAs may be based on the MURC table. For each LBA, the placement factor is equal to a predetermined metadata update count weightage multiplied by the metadata update count for the LBA added to a predetermined recency count weightage multiplied by the recency count for the LBA.

In operation 514, the data classifier module classifies each of the one or more LBAs as warm LBAs or hot LBAs based on the placement factor of each of the one or more LBAs. In one embodiment, the data classifier module is further configured to calculate an APF of the data storage system, and compare the placement factor of each of the one or more LBAs to the APF, as illustrated in method 400. An LBA is classified as hot if the placement factor of the LBA is greater than the APF. An LBA is classified as warm if the placement factor of the LBA is greater than 50% of the APF but less than 100% of the APF. The APF may be dynamic and vary over time, and as such the threshold between hot data and warm data may also be dynamic may vary over time.

In operation 516, the data classifier module routes the one or more streams of data associated with the hot LBAs to a hot open memory block. In operation 518, the data classifier module routes the one or more streams of data associated with the warm LBAs to a warm open memory block.

Since one or more LBAs may be classified as cold and routed to cold open memory blocks in operation 506 and operation 510, the cold LBAs need not be sent to the data classifier module to be classified. Thus, only the one or more LBAs that have undergone one or more overwrites and belong to more than one stream (e.g. hot and/or warm LBAs) may be received by the data classifier module to be classified. However, if one or more cold LBAs (i.e. where the placement factor of an LBA is lower than 50% of the APF) are received by the data classifier module, the data classifier module is configured to classify the one or more LBAs as cold, and route the one or more streams of data associated with the cold LBAs to a cold open memory block, as illustrated in method 400.

Since hot streams of data are overwritten frequently, the hot memory blocks will be invalidated and be automatically freed, reducing the number of fragmented, partially valid memory blocks. Thus, garbage collection can target warm and cold memory blocks to increase garbage collection efficiency and reduce block erasures. Reducing the number of block erasures improves block endurance, and more efficient garbage collection results in reduced write amplification, improving the overall write performance of a data storage system.

Figure 6:
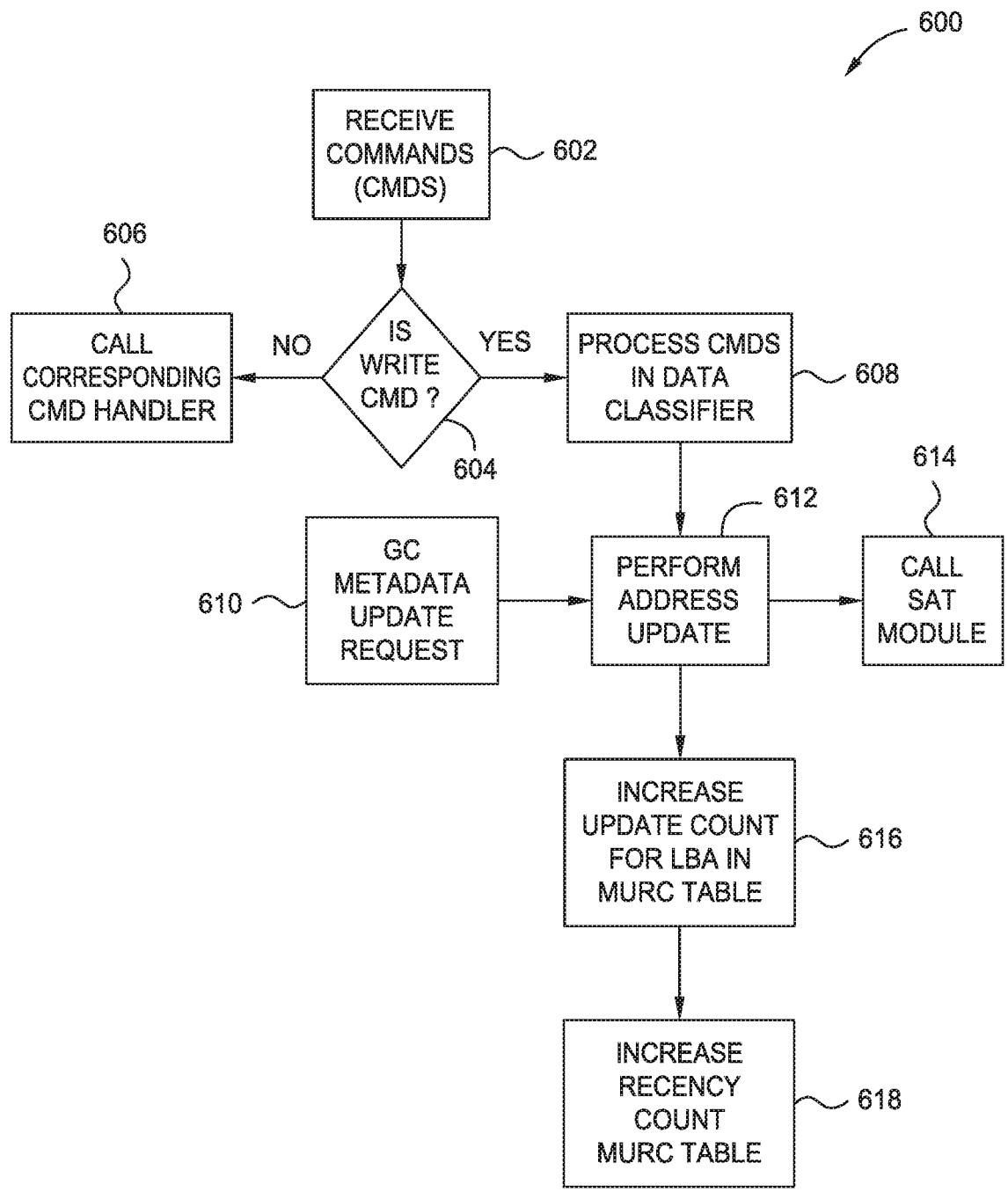
FIG. 6 illustrates a method for updating a metadata update and recency count table, according to one embodiment.

FIG. 6 illustrates a method 600 for updating a MURC table, according to one embodiment. Method 600 may be used in combination with method 400 and method 500. For example, method 600 may be used in operation 404 of method 400, and in operation 512 of method 500.

In operation 602, a controller receives one or more commands along with host data from a host device. In operation 604, the controller determines whether the one or more commands are write commands. If the controller determines one or more of the commands are not write commands (e.g. read commands), the method 600 proceeds to operation 606. In operation 606, the controller calls the corresponding command handler, and sends the one or more read commands to the read command handler.

If the controller determines one or more commands are write commands, the method 600 proceeds to operation 608. In operation 608, the controller sends the one or more write commands and host data to a data classifier module, and the data classifier module processes the one or more write commands. The data classifier module may determine the associated LBA to each of the one or more write commands and data, and determine the length of each of the one or more write commands and data.

Garbage collection metadata requests may be sent to the data classifier module in operation 610. In operation 612, the data classifier module performs an LBA update for each of the one or more write commands associated with an LBA. The data classifier module receives garbage collection update requests, and updates the one or more LBA accordingly. In operation 614, the data classifier module sends the updated LBA to an SAT module.

In operation 616, the data classifier module increases the metadata update count for the one or more LBA in the MURC table. The MURC table is comprised of a metadata entry update count for each of the one or more LBAs and a recency count of the one or more LBAs. The metadata entry of an LBA may include the PBA the LBA is mapped to, and a run length of the LBA. The metadata entry update count is directly proportional to the number of times an LBA has been referenced. Thus, the more frequently the LBA has been referenced, the higher the metadata entry update count. Additionally, the metadata entry update count is increased if the LBA has been overwritten or updated. As such, the more frequently the LBA has been overwritten or updated, the higher the metadata entry update count. The higher the metadata update count is for a particular LBA, the hotter the LBA will be considered. Likewise, LBAs having a lower metadata update count will be considered colder.

In operation 618, the data classifier module increases the recency count for the one or more LBA in the MURC table. The recency count comprises a time stamp associated with each of the one or more LBAs. Each LBA received by a data storage device is associated with a time stamp. The time stamp associated with an LBA is increased each time the LBA is updated. The higher the time stamp of an LBA, the higher the recency count of the LBA. Thus, the recency count of the LBA is increased each time the time stamp is increased. The higher the recency count is for a particular LBA, the hotter the LBA will be considered. Likewise, LBAs having a lower recency count will be considered colder.

Figure 7A:
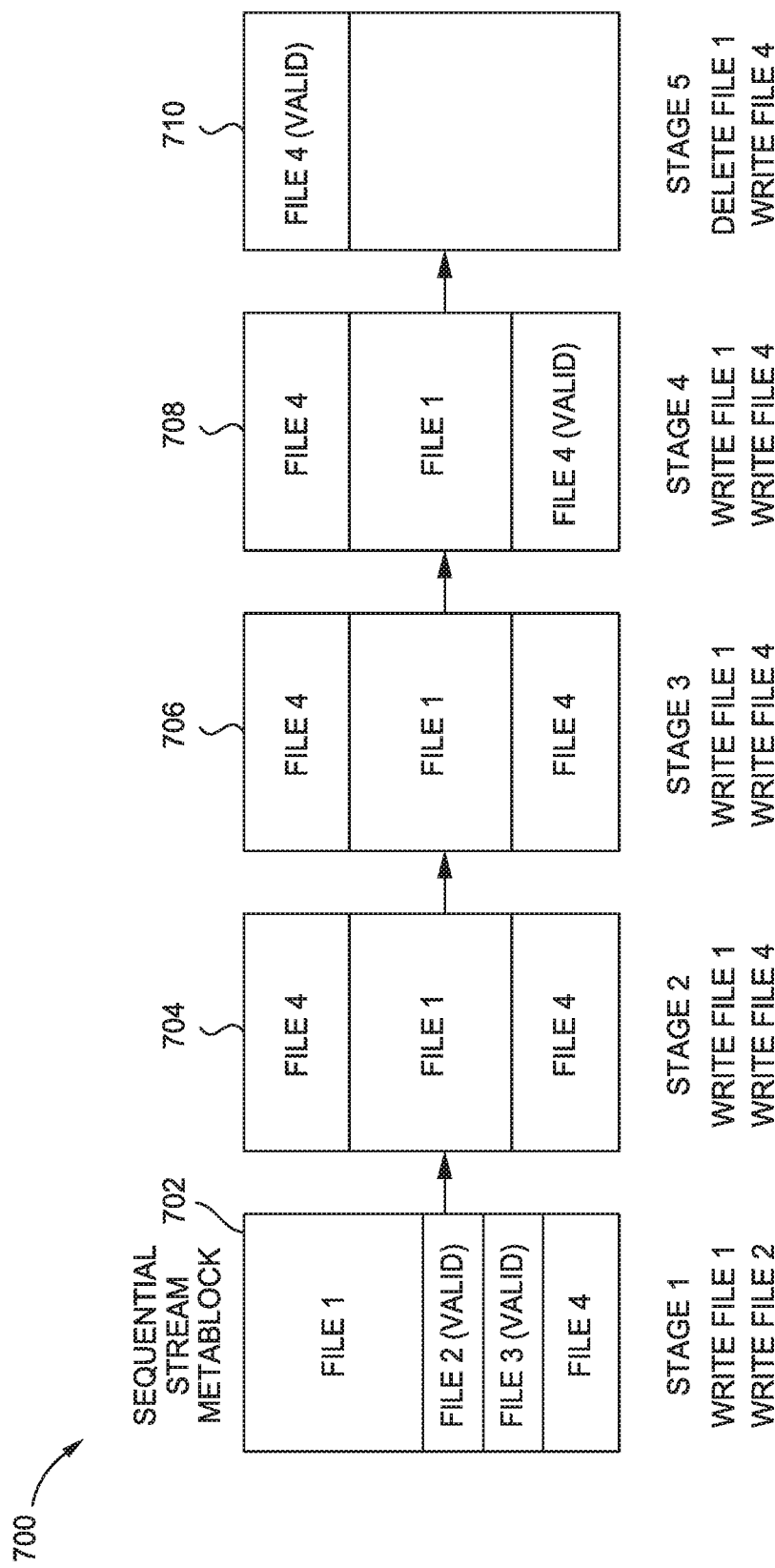
FIGS. 7A-7B are block diagrams illustrating the efficiency of the data classifying methods, according to one embodiment.
Figure 7B:
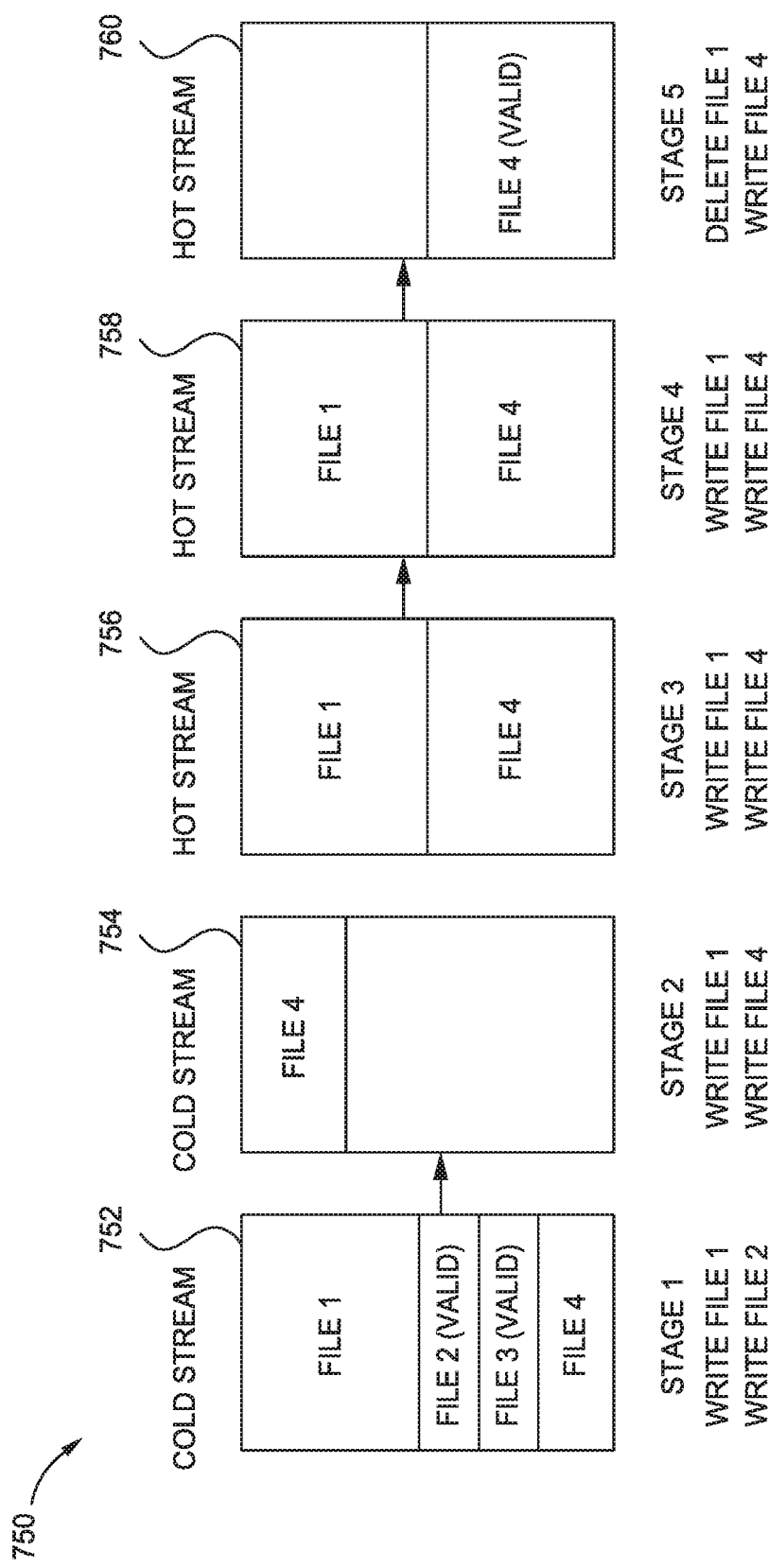

FIGS. 7A-7B are block diagrams illustrating the efficiency of the data classifying methods, such as method 400 and method 500. FIG. 7A illustrates a sequential stream block method 700. FIG. 7B illustrates a classified data block method 750, such as method 400 or method 500.

In the sequential stream block method 700, a controller receives four LBA streams, File 1, File 2, File 3, and File 4, and routes the four LBA streams to a sequential stream, depicted in block 702. File 1 and File 4 are written alternatively, as shown in blocks 704, 706, and 708. In block 710, File 1 is deleted, and File 4 is written again. Thus, while File 2 and File 3 remain valid, File 1 and File 4 are constantly being invalidated, resulting in fragmented blocks 702, 708, and 710. In sequential stream block method 700, three metablocks are still in use, while only two metablocks are released to the free pool of blocks.

In the classified data block method 750, a controller receives four LBA streams, File 1, File 2, File 3, and File 4, and routes the four LBA streams to a cold stream, as shown in block 752. File 1 is then rewritten, and invalided from block 754. In block 756 and block 758, File 1 and File 4 are written alternatively, and are routed to a hot stream. In block 760, File 1 is deleted, and File 4 is written again. In the classified data block method 750, two metablocks are still in use, while three metablocks are released to the free pool of blocks. Thus, in the classified data block method 750, if multiple applications are sending repeated data, like File 1 and File 4, the data from those applications can be classified as hot data and be stored in a single hot open memory block to make garbage collection more efficient.

Since hot streams of data, like File 1 and File 4, are overwritten frequently, the hot memory blocks will be invalidated and be automatically freed, reducing the number of fragmented, partially valid memory blocks, as demonstrated in the classified data block method 750. Thus, garbage collection can target warm and cold memory blocks to increase garbage collection efficiency and reduce block erasures. Reducing the number of block erasures improves block endurance, and more efficient garbage collection results in reduced write amplification, improving the overall write performance of a data storage system. By classifying data as hot, warm, or cold, and routing the classified data to respective hot, warm, or cold open blocks, the longevity of the device is increased, and errors are reduced.

In one embodiment, a method for classifying data in a data storage device comprises receiving, by a controller of the data storage device, one or more streams of data associated with one or more logical block addresses. A placement factor for each of the one or more logical block addresses is then calculated. An average placement factor is calculated based on the total number of logical block addresses in the data storage device. The placement factor of each of the one or more logical block addresses is compared to the average placement factor. Each of the one or more logical block addresses is classified as hot logical block addresses, warm logical block addresses, or cold logical block addresses based on the comparison of the placement factor of each of the one or more logical block addresses to the average placement factor. Each of the one or more streams of data associated with the hot logical block addresses are routed to a hot open memory block of the data storage device, each of the one or more streams of data associated with the warm logical block addresses are routed to a warm open memory block of the data storage device, and each of the one or more streams of data associated with the cold logical block addresses are routed to a cold open memory block of the data storage device.

The method of classifying data in the data storage device may further comprise determining whether the each of the one or more logical block addresses has undergone one or more overwrites, and routing each of the one or more streams of data associated with the one or more logical block addresses that have been determined not to have undergone one or more overwrites to a cold open memory block of the data storage device.

The method of classifying data in the data storage device may further comprise updating, in a data classifier module of the data storage device, a metadata update and recency count table for each of the one or more logical block addresses. The metadata update and recency count table may be utilized in calculating the placement factor for each of the one or more logical block addresses. The metadata update and recency count table may comprise a metadata entry update count for each of the one or more logical block addresses and a recency count for each of the one or more logical block addresses. The metadata entry update count may be directly proportional to the number of times a logical block address has been referenced. The metadata entry update count may be increased if a logical block address has been overwritten or updated. The recency count may comprise a time stamp associated with each of the one or more logical block addresses. The time stamp increases when a corresponding logical block address has been updated. The recency count of a logical block address may be increased each time the time stamp is increased.

The placement factor may be equal to a predetermined metadata update count weightage multiplied by the metadata update count for the logical block address added to a predetermined recency count weightage multiplied by the recency count for the logical block address. The average placement factor is equal to a sum of the total placement factors for all valid logical block addresses divided by the total number of valid un-erased logical block addresses. A logical block address may be classified as hot if the placement factor of the logical block address is greater than the average placement factor. A logical block address may be classified as cold if the placement factor of the logical block address is lower than 50% of the average placement factor. A logical block address may be classified as warm if the placement factor of the logical block address is greater than 50% of the average placement factor but less than 100% of the average placement factor.

In another embodiment, a method for classifying data in a data storage device comprises receiving, by a controller of the data storage device, one or more streams of data associated with one or more logical block addresses, and determining that there is a stream switch of the one or more streams of data. The method further comprises determining whether each of the one or more streams of data that have been determined to have undergone a stream switch have further undergone one or more overwrites. In a data classifier module of the data storage device, a placement factor is calculated for each of the one or more streams of data that have been determined to have undergone one or more overwrites. Each of the one or more streams of data are classified as hot streams of data or warm streams of data based on the placement factor of each of the one or more streams of data. The hot streams of data are routed to a hot open memory block of the plurality of memory blocks and the warm streams of data are routed to a warm open memory block of the plurality of memory blocks.

The one or more streams of data may be sequential streams of data. The method of classifying data in the data storage device may further comprise classifying each of the one or more streams of data as cold streams of data, and routing the cold streams of data to a cold open memory block of the plurality of memory blocks. The placement factor may be based on a metadata update and recency count table for each of the one or more streams of data.

In one embodiment, a data storage device comprises one or more memory devices comprising a plurality of memory blocks. A controller is coupled to the one or more memory devices. The controller is configured to receive one or more streams of data associated with one or more logical block addresses. A random access memory is coupled to the controller. The random access memory includes a flash transition layer and a log page coupled to the one or more memory devices. A data classifier module is located in the random access memory. The data classifier module is coupled to the controller and the plurality of memory blocks. The data classifier module is configured to store a metadata entry update count and a recency count of each of the one or more logical block addresses. The metadata update and recency count table is stored in the log page.

The data classifier module may be further configured to calculate a placement factor of the one or more logical block addresses. The data classifier module may be further configured to classify each of the one or more streams of data as hot, warm, or cold based on the placement factor of each of the one or more streams of data. The data classifier module may be further configured to route each of the one or more streams of data to a hot open memory block of the plurality of memory blocks, a warm open memory block of the plurality of memory blocks, or a cold open memory block of plurality of memory blocks based on the classification of each of the one or more streams of data as hot, warm, or cold.

In another embodiment, a data storage device comprises one or more memory devices comprising a plurality of memory blocks, and means for receiving one or more streams of data associated with one or more logical block addresses. The data storage device further comprises means for updating a metadata update and recency count table for each of the one or more logical block addresses, means for calculating a placement factor for each of the one or more streams of data associated with the one or more logical block addresses based on the metadata update and recency count table, and means for classifying each of the one or more streams of data associated with the one or more logical block addresses as hot streams of data, warm streams of data, or cold streams of data based on the placement factor. The data storage device further comprises means for routing the hot streams of data to a hot open memory block of the plurality of memory blocks, routing the warm streams of data to a warm open memory block of the plurality of memory blocks, and routing the cold streams of data to a cold open memory block of the plurality of memory blocks.

The data storage device may further comprise means for comparing the placement factor of each of the one or more streams of data associated with the one or more logical block addresses to an average placement factor.

In yet another embodiment, a data storage system comprises a host device and a storage device coupled to the host device. The storage device comprises one or more memory devices comprising a plurality of memory blocks, and a controller coupled to the one or more memory devices. The controller is configured to receive one or more streams of data from the host device. A data classifier module is coupled to the controller and the one or more memory devices. The data classifier module is configured to classify each of the one or more streams of data as hot, warm, or cold based on a placement factor of each of the one or more streams of data, and route each of the one or more streams of data to a hot open memory block of the plurality of memory blocks, a warm open memory block of the plurality of memory blocks, or a cold open memory block of plurality of memory blocks based on the classification of each of the one or more streams of data as hot, warm, or cold.

The one or more streams of data may be sequential streams of data. The storage device may further include a storage address table module. The data classifier module may be further configured to calculate the placement factor of the one or more streams of data.

By classifying data with similar characteristics and writing the classified data to a corresponding open block, garbage collection efficiency can be improved. Classifying data as hot, warm, or cold, and storing the classified data in hot, warm, or cold open memory blocks avoids creating multiple open blocks equivalent to the number of streams of data, and avoids the mixing of data with different characteristics to reduce garbage collection overhead. By avoiding the mixture of data with different characteristics, memory blocks are less fragmented. Due to the memory blocks being less fragmented, garbage collection is more efficient, as fewer garbage collection cycles will be required to free a memory block.

While the foregoing is directed to implementations of the present disclosure, other and further implementations of the disclosure may be devised without departing from the basic scope thereof, and the scope thereof is determined by the claims that follow.

What is claimed is:

1. A method for classifying data in a data storage device, comprising:
   receiving, by a controller of the data storage device, one or more streams of data associated with one or more logical block addresses;
   determining whether there is a stream switch of the one or more streams of data, wherein any streams of data of the one or more streams of data that have not undergone a stream switch are classified as cold;
   determining whether each of the one or more streams of data that have been determined to have undergone a stream switch have further undergone one or more overwrites, wherein any streams of data of the one or more streams of data that have been determined to have undergone a stream switch but have not undergone one or more overwrites are classified as cold;
   calculating a placement factor for each of the one or more logical block addresses associated with one or more unclassified streams of data, wherein the placement factor for each of the one or more logical block addresses is individually calculated, wherein a metadata update and recency count table is utilized in calculating the placement factor for each of the one or more logical block addresses, the metadata update and recency count table comprising an individual metadata entry update count for each of the one or more logical block addresses and an individual recency count for each of the one or more logical block addresses;
   calculating an average placement factor based on a total number of logical block addresses in the data storage device;
   comparing the placement factor of each of the one or more logical block addresses to the average placement factor;
   classifying each of the one or more logical block addresses as hot logical block addresses or warm logical block addresses based on the comparison of the placement factor of each of the one or more logical block addresses to the average placement factor; and routing each of the one or more streams of data associated with the hot logical block addresses to a hot open memory block of the data storage device, each of the one or more streams of data associated with the warm logical block addresses to a warm open memory block of the data storage device, and each of the one or more streams of data associated with the cold logical block addresses to a cold open memory block of the data storage device.

2. The method of claim 1, further comprising: updating, in a data classifier module of the data storage device, the metadata update and recency count table for each of the one or more logical block addresses.

3. The method of claim 2, wherein the metadata entry update count is directly proportional to the number of times a logical block address has been referenced.

4. The method of claim 2, wherein the metadata entry update count is increased if a logical block address has been overwritten or updated.

5. The method of claim 2, wherein the recency count comprises a time stamp associated with each of the one or more logical block addresses, and wherein the time stamp increases when a corresponding logical block address has been updated.

6. The method of claim 5, wherein the recency count of a logical block address is increased each time the time stamp is increased.

7. The method of claim 2, wherein the placement factor is equal to a predetermined metadata update count weightage multiplied by the metadata update count for the logical block address added to a predetermined recency count weightage multiplied by the recency count for the logical block address.

8. The method of claim 7, wherein the average placement factor is equal to a sum of a total placement factors for all valid logical block addresses divided by a total number of valid un-erased logical block addresses.

9. The method of claim 1, wherein a logical block address is classified as hot if the placement factor of the logical block address is greater than the average placement factor.

10. The method of claim 1, wherein a logical block address is classified as cold if the placement factor of the logical block address is lower than 50% of the average placement factor.

11. The method of claim 1, wherein a logical block address is classified as warm if the placement factor of the logical block address is greater than 50% of the average placement factor but less than 100% of the average placement factor.

12. A method for classifying data in a data storage device, comprising:
receiving, by a controller of the data storage device, one or more streams of data associated with one or more logical block addresses;
determining whether there is a stream switch of the one or more streams of data, wherein any streams of data of the one or more streams of data that have not undergone a stream switch are classified as cold;
determining whether each of the one or more streams of data that have been determined to have undergone a stream switch have further undergone one or more overwrites, wherein any streams of data of the one or more streams of data that have been determined to have undergone a stream switch but have not undergone one or more overwrites are classified as cold;
calculating, in a data classifier module of the data storage device, a placement factor for each of the one or more unclassified streams of data that have been determined to have undergone one or more overwrites, wherein the placement factor for each of the one or more unclassified streams of data is individually calculated;
calculating an average placement factor based on a total number of logical block addresses in the data storage device;
comparing the placement factor of each of the one or more logical block addresses to the average placement factor;
classifying each of the one or more streams of data as hot streams of data or warm streams of data based on the placement factor of each of the one or more streams of data, wherein a logical block address is classified as hot only when the placement factor of the logical block address is greater than the average placement factor, and wherein a logical block address is classified as warm only when the placement factor of the logical block address is greater than 50% of the average placement factor but less than 100% of the average placement factor; and
routing the hot streams of data to a hot open memory block of a plurality of memory blocks and the warm streams of data to a warm open memory block of the plurality of memory blocks.

13. The method of claim 12, wherein the one or more streams of data are sequential streams of data.

14. The method of claim 12, further comprising: routing the streams of data classified as cold to a cold open memory block of the plurality of memory blocks.

15. The method of claim 12, wherein the placement factor is based on a metadata update and recency count table for each of the one or more streams of data.

16. A data storage device, comprising:
one or more memory devices comprising a plurality of memory blocks;
a controller coupled to the one or more memory devices, wherein the controller is configured to:
receive one or more streams of data associated with one or more logical block addresses;
determine whether there is a stream switch of the one or more streams of data, wherein any streams of data of the one or more streams of data that have not undergone a stream switch are classified as cold; and
determine whether each of the one or more streams of data that have been determined to have undergone a stream switch have further undergone one or more overwrites, wherein any streams of data of the one or more streams of data that have been determined to have undergone a stream switch but have not undergone one or more overwrites are classified as cold; and
a random access memory coupled to the controller, wherein the random access memory includes a flash transition layer and a log page coupled to the one or more memory devices; and
a data classifier module located in the random access memory, the data classifier module coupled to the controller and the plurality of memory blocks, wherein the data classifier module is configured to:
store a metadata entry update count and a recency count of each of the one or more logical block addresses in a metadata update and recency count table, the metadata update and recency count table comprising an individual metadata entry update count for each of the one or more logical block addresses and an individual recency count for each of the one or more logical block addresses, wherein the metadata update and recency count table is stored in the log page; and
calculate a placement factor for each of the one or more logical block addresses associated with the one or more unclassified streams of data, wherein the placement factor for each of the one or more logical block addresses is individually calculated.

17. The data storage device of claim 16, wherein the data classifier module is further configured to classify each of the one or more streams of data as hot, warm, or cold based on the placement factor of each of the one or more streams of data.

18. The data storage device of claim 17, wherein the data classifier module is further configured to route each of the one or more streams of data to a hot open memory block of the plurality of memory blocks, a warm open memory block of the plurality of memory blocks, or a cold open memory block of plurality of memory blocks based on the classification of each of the one or more streams of data as hot, warm, or cold.

19. A data storage device, comprising:
one or more memory devices comprising a plurality of memory blocks;
means for receiving one or more streams of data associated with one or more logical block addresses;
means for updating a metadata update and recency count table for each of the one or more logical block addresses, the metadata update and recency count table comprising an individual metadata entry update count for each of the one or more logical block addresses and an individual recency count for each of the one or more logical block addresses;
means for determining whether the one or more streams or data have undergone a stream switch;
means for classifying any streams of data of the one or more streams of data that have not undergone a stream switch as cold;
means for determine whether each of the one or more streams of data that have undergone a stream switch have further undergone or more overwrites;
means for classifying any streams of data of the one or more streams of data that have been determined to have undergone a stream switch that have not undergone one or more overwrites are classified as cold;
means for calculating a placement factor for each of the one or more unclassified streams of data associated with the one or more logical block addresses based on the metadata update and recency count table, wherein the means for calculating a placement factor for each of the one or more logical block addresses comprises individually calculating the placement for each of the one or more logical block addresses;
means for classifying each of the one or more unclassified streams of data associated with the one or more logical block addresses as hot streams of data or warm streams of data based on the placement factor; and
means for routing the hot streams of data to a hot open memory block of the plurality of memory blocks, and routing the warm streams of data to a warm open memory block of the plurality of memory blocks.

20. The data storage device of claim 19, further comprising: means for comparing the placement factor of each of the one or more streams of data associated with the one or more logical block addresses to an average placement factor.

21. A data storage system, comprising:
a host device; and
a storage device coupled to the host device, the storage device comprising:
one or more memory devices comprising a plurality of memory blocks;
a controller coupled to the one or more memory devices, wherein the controller is configured to:
receive one or more streams of data associated with one or more logical block addresses from the host device;
determine whether there is a stream switch of the one or more streams of data, wherein any streams of data of the one or more streams of data that have not undergone a stream switch are classified as cold; and
determine whether each of the one or more streams of data that have been determined to have undergone a stream switch have further undergone one or more overwrites, wherein any streams of data of the one or more streams of data that have been determined to have undergone a stream switch but have not undergone one or more overwrites are classified as cold; and
a data classifier module coupled to the controller and the one or more memory devices, wherein the data classifier module is configured to:
calculate a placement factor for each of the one or more unclassified streams of data, wherein the placement factor for each of the one or more unclassified streams of data is individually calculated;
calculating an average placement factor based on a total number of logical block addresses in the data storage device;
comparing the placement factor of each of the one or more logical block addresses to the average placement factor;
classify each of the one or more unclassified streams of data as hot, warm, or cold based on the placement factor of each of the one or more streams of data, and route each of the one or more streams of data to a hot open memory block of the plurality of memory blocks, a warm open memory block of the plurality of memory blocks, or a cold open memory block of plurality of memory blocks based on the classification of each of the one or more streams of data as hot, warm, or cold,
wherein:
a logical block address is classified as hot only when the placement factor of the logical block address is greater than the average placement factor,
a logical block address is classified as warm only when the placement factor of the logical block address is greater than or equal to 50% of the average placement factor but less than 100% of the average placement factor, and
a logical block address is classified as cold only when the placement factor of the logical block address is lower than 50% of the average placement factor.

22. The data storage system of claim 21, wherein the one or more streams of data are sequential streams of data.

23. The data storage system of claim 21, wherein the storage device further includes a storage address table module.

* * * * *